United States Patent [19]
Tognetti

[11] Patent Number: 5,649,731
[45] Date of Patent: Jul. 22, 1997

[54] WORKBENCH ON VEHICLE MOUNTED TRACKS

[76] Inventor: Brian J. Tognetti, 2324 Castlewood, Gaylord, Mich. 49735

[21] Appl. No.: 639,919

[22] Filed: Apr. 24, 1996

[51] Int. Cl.⁶ .................................................. B62D 33/08
[52] U.S. Cl. ................................................ 296/26; 296/57.1
[58] Field of Search ................................ 296/26, 57.1

[56] References Cited

U.S. PATENT DOCUMENTS

| | | |
|---|---|---|
| 2,784,027 | 5/1957 | Temp . |
| 2,852,303 | 9/1958 | Hopson ........................ 296/26 |
| 3,004,790 | 10/1961 | Mayer ........................... 296/26 |
| 4,681,360 | 7/1987 | Peters et al. . |
| 4,733,898 | 3/1988 | Williams . |
| 4,824,158 | 4/1989 | Peters et al. . |
| 4,830,242 | 5/1989 | Painter . |
| 4,993,088 | 2/1991 | Chudik ......................... 296/26 |
| 5,052,878 | 10/1991 | Brockhaus . |
| 5,064,335 | 11/1991 | Bergeron et al. ............ 296/26 |
| 5,513,941 | 5/1996 | Kulas et al. .................. 296/26 |

*Primary Examiner*—Gary C. Hoge
*Attorney, Agent, or Firm*—Learman & McCulloch

[57] ABSTRACT

The workbench is formed by a rigid plate member (90) supported by rollers (58 and 66) and rails (46 and 52) secured to the floor (24) of a cargo compartment. The rollers (58 and 66) have grooves (60 and 68) that receive portions of the rails (46 and 52). An H-beam (74) is secured to the floor (24) parallel to the two rails (46 and 52). Hold down roller (98) attached to the plate member (90) engage and downwardly facing surface of the top flange (82) of the H-beam (74). A cargo compartment door (28) is connected to plate member (90) by hinges (130). Telescopic legs (110) are mounted on the plate member (90). A spring loaded pin (152) and a groove (154) limit movement of the plate member (90) to the rear on the rails (46 and 52).

18 Claims, 5 Drawing Sheets

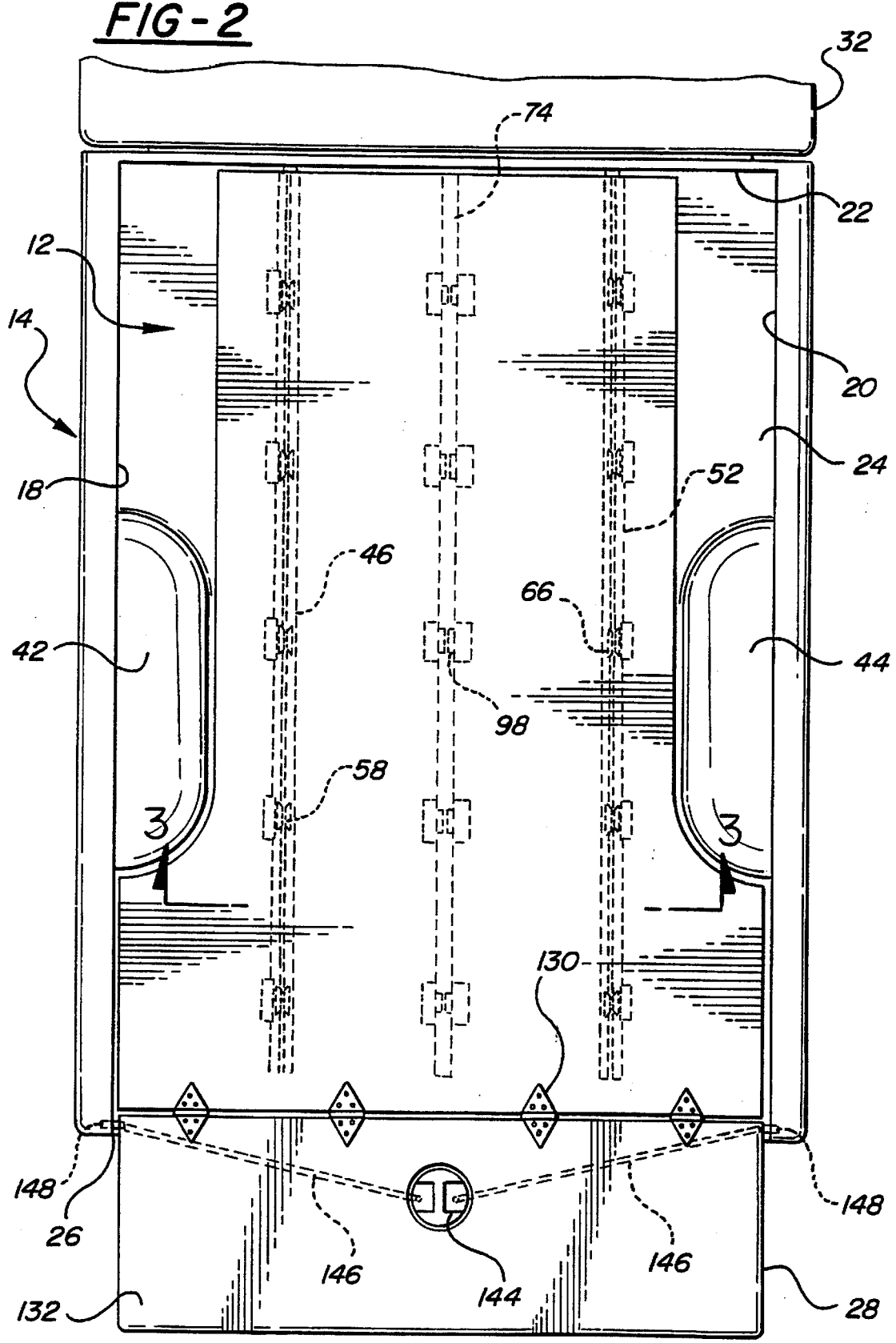

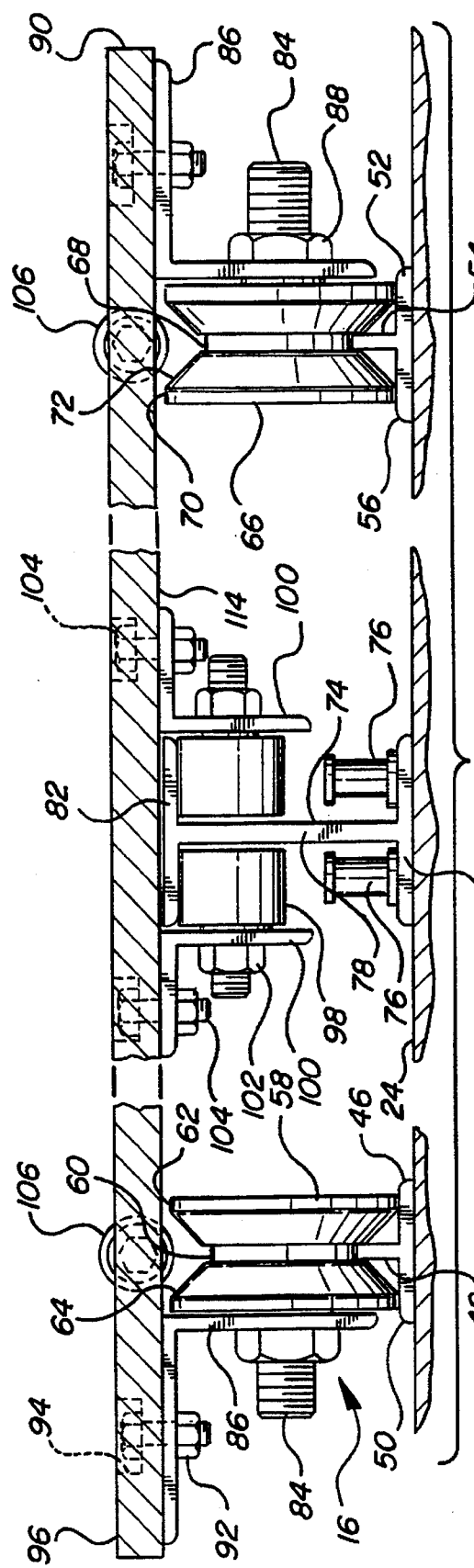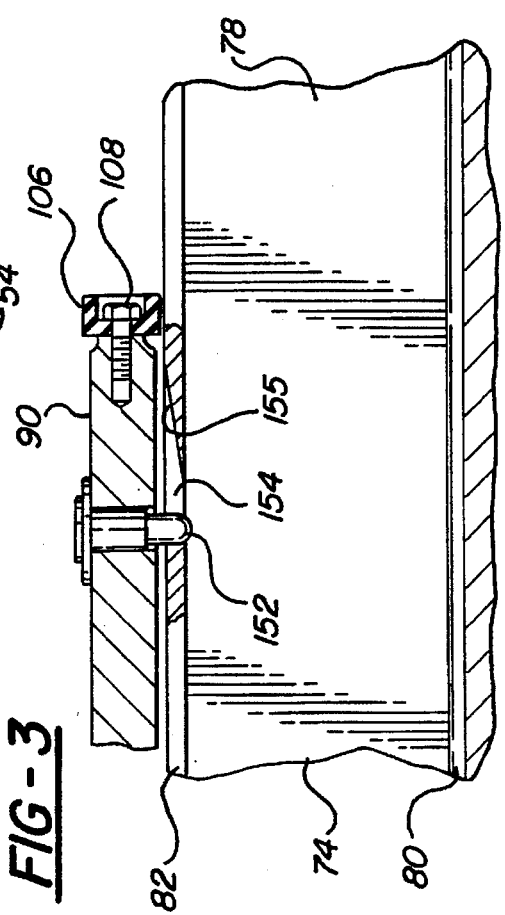

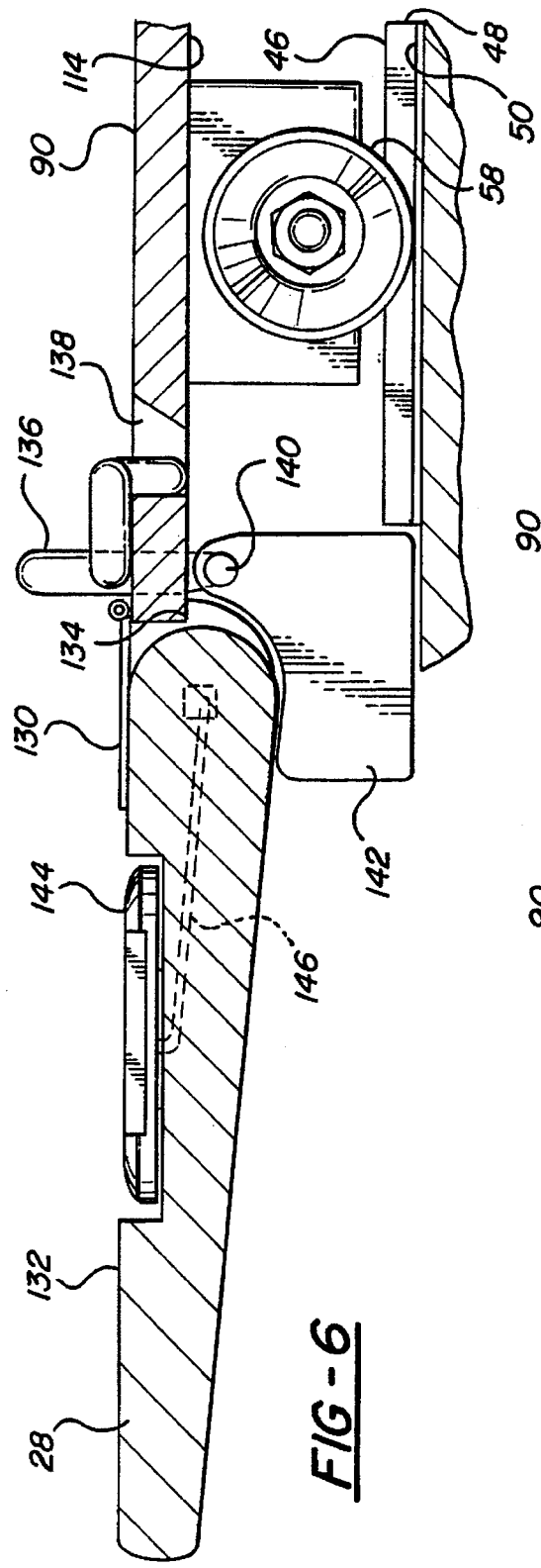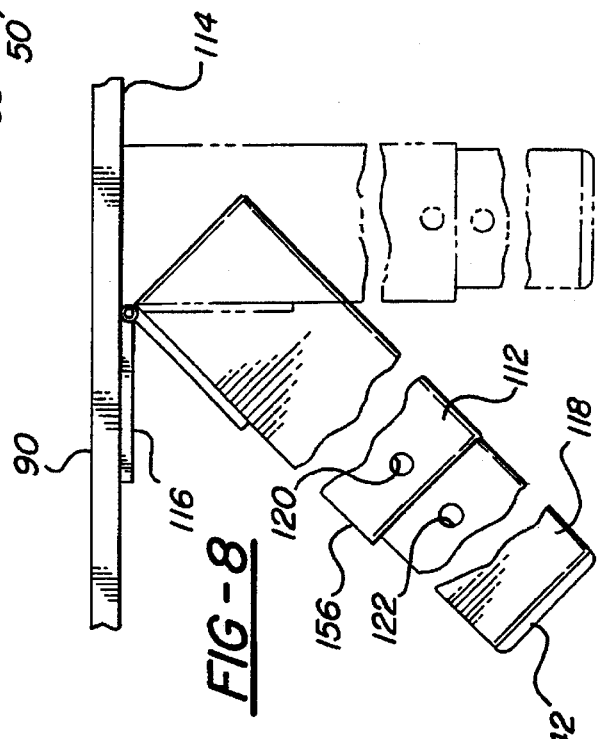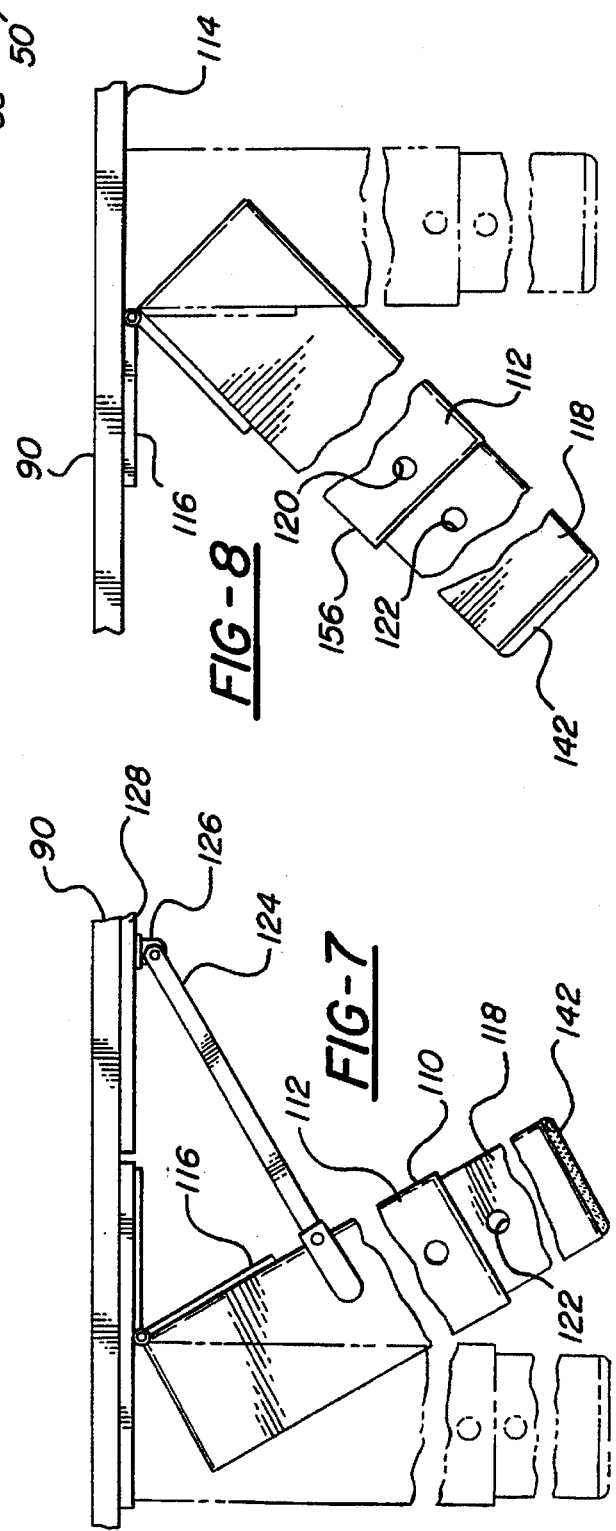

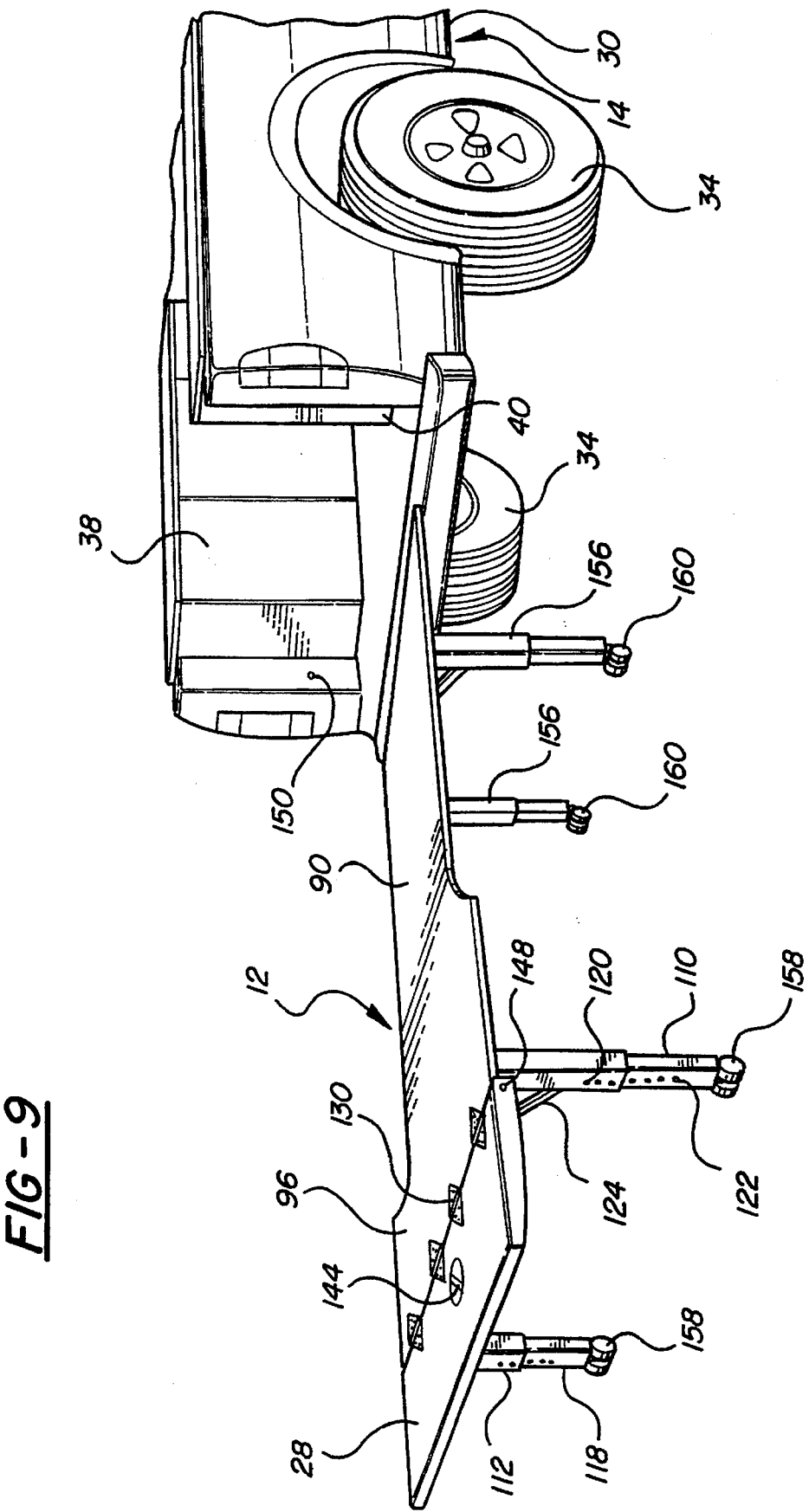

WORKBENCH ON VEHICLE MOUNTED TRACKS

This invention relates to

BACKGROUND OF THE INVENTION

1. Technical Field

Invention relates to a work bench and more particularly to a workbench mounted on tracks in a vehicle cargo compartment that can be slid out of the cargo compartment for use and slid back into the cargo compartment for storage and for supporting cargo.

2. Description of the Prior Art

Containers for various purposes have been mounted on tracks in the cargo compartments of pick-up trucks in the past. Some of these containers have multiple partitioned storage areas and slide under a false floor. Cargo can be carried on the false floors. The partitioned individual storage areas may be provided with hinged covers or lids. These lids can be used as work surfaces if care is taken to prevent lid damage. The lids used with these partitioned storage areas are not designed to support much weight, are generally higher than a normal workbench and cannot be opened with objects sitting on top of them. If they are used as working surfaces they cannot serve their intended function of providing quick and easy access to materials in the partitioned storage areas.

The containers with partitioned areas have been supported by rollers that roll on the floor of the vehicle cargo compartment or on side tracks. Cargo compartment floors can be damaged by rollers when the vehicle passes over bumps because the floors are not designed to support large loads on small surface areas. Side walls or beams guide the containers having bottom rollers. Side tracks support and guide the containers with side tracks.

Large containers with an open top have been mounted on side rails in cargo compartments. The purpose of these containers is to facilitate loading and unloading of the cargo compartment especially when the compartment has a fixed cover. The container is rolled out of the cargo compartment on the side tracks where it can be loaded from the sides. After the container is filled it is rolled back into the cargo compartment. The procedure is reversed to unload the cargo compartment. These track mounted containers have rigid sides that limit or preclude their use as a workbench. The sides cannot be removed because they include the rails or rollers that are supported by the side tracks.

A retractable bed has also been used to assist in unloading heavy objects from pick-up trucks. The bed is a plywood sheet supported by three telescoping rail assemblies. The bottom rail assembly includes two spaced apart channels fixed to the floor of the pickup cargo body. An intermediate rail assembly has two tubular members with attached rollers supported and guided by the bottom rail assembly. The upper rail assembly includes two channels positioned between the two tubular members that are supported and guided by rollers on the two tubular members. The plywood sheet is secured to the upper rail assembly. This retractable bed can support relatively heavy objects even when the object is to the rear of the pickup truck. However, the plywood sheet is several inches above the floor of the pickup truck bed and reduces the area of the bed available for containing cargo.

SUMMARY OF THE INVENTION

An object of the invention is to provide a workbench that is supported in a vehicle cargo compartment by tracks and can be slid partially or completely out of the cargo compartment for use. Another object of the invention is to provide a workbench mounted in a vehicle cargo compartment that takes minimal space and that can support cargo for transport. A further object of the invention is to provide a workbench supported above support tracks and rollers at an elevation suitable for use as a workbench by builders, carpenters and others. A still further object of the invention is to mount a workbench on a track and roller system that fixes the lateral position.

The workbench includes a rigid plate member supported by a track and roller system in the cargo compartment of a vehicle. Tracks include vertical bars with horizontal flanges secured to each side of the cargo compartment floor. The rollers each include a groove in their periphery that receives a portion of the vertical bar to laterally fix the rigid plate, the rollers and the track relative to each other.

An H-beam is secured to the floor of the cargo compartment between the tracks and the rollers with grooves. Rollers carried by the rigid plate member engage downwardly facing surfaces on the top flange of the H-beam to limit vertical movement of the rigid plate member and maintain engagement between the roller grooves and the tracks.

The door of the vehicle cargo compartment is secured to the rear edge of the rigid plate member by hinges. When the door is latched in a closed position, it holds the workbench within the cargo compartment. The door can be rotated to a horizontal position in which it is an extension of the workbench when the door latch is released.

Two telescopic legs are pivotally attached to the rear of the rigid plate member and support the plate member when it is partially slid out of the cargo compartment. Front telescopic legs can also be attached to the front portion of the rigid plate member to support the plate member when it is completely removed from the cargo compartment. The ground engaging ends of the telescopic legs can be provided with plate covers or wheels.

THE DRAWINGS

Other advantages of the present invention will be ready appreciated as the same become better understood by reference to the following detailed description when considered in connection with the accompanying drawings wherein:

FIG. 2 is a top plan view with the workbench completely in the pick-up cargo compartment and the door in a horizontal open position;

FIG. 3 is an enlarged sectional view taken along line 3—3 and FIG. 2;

FIG. 4 is a side elevational view of the forward end of the center H-beam and the spring loaded stop pin;

FIG. 5 is a view similar to FIG. 4 with a spring-loaded stop pin in a slot and preventing movement of the workbench to the rear;

FIG. 6 is an enlarged sectional view taken along line 6—6 in FIG. 2;

FIG. 7 is an enlarged elevational view of a rear telescopic leg;

FIG. 8 is an enlarged sectional view of a front telescopic leg; and

FIG. 9 is a perspective view of the workbench supported on four legs and separated from the pick-up truck.

DETAILED DESCRIPTION OF THE PREFERRED EMBODIMENTS

Figure 1:
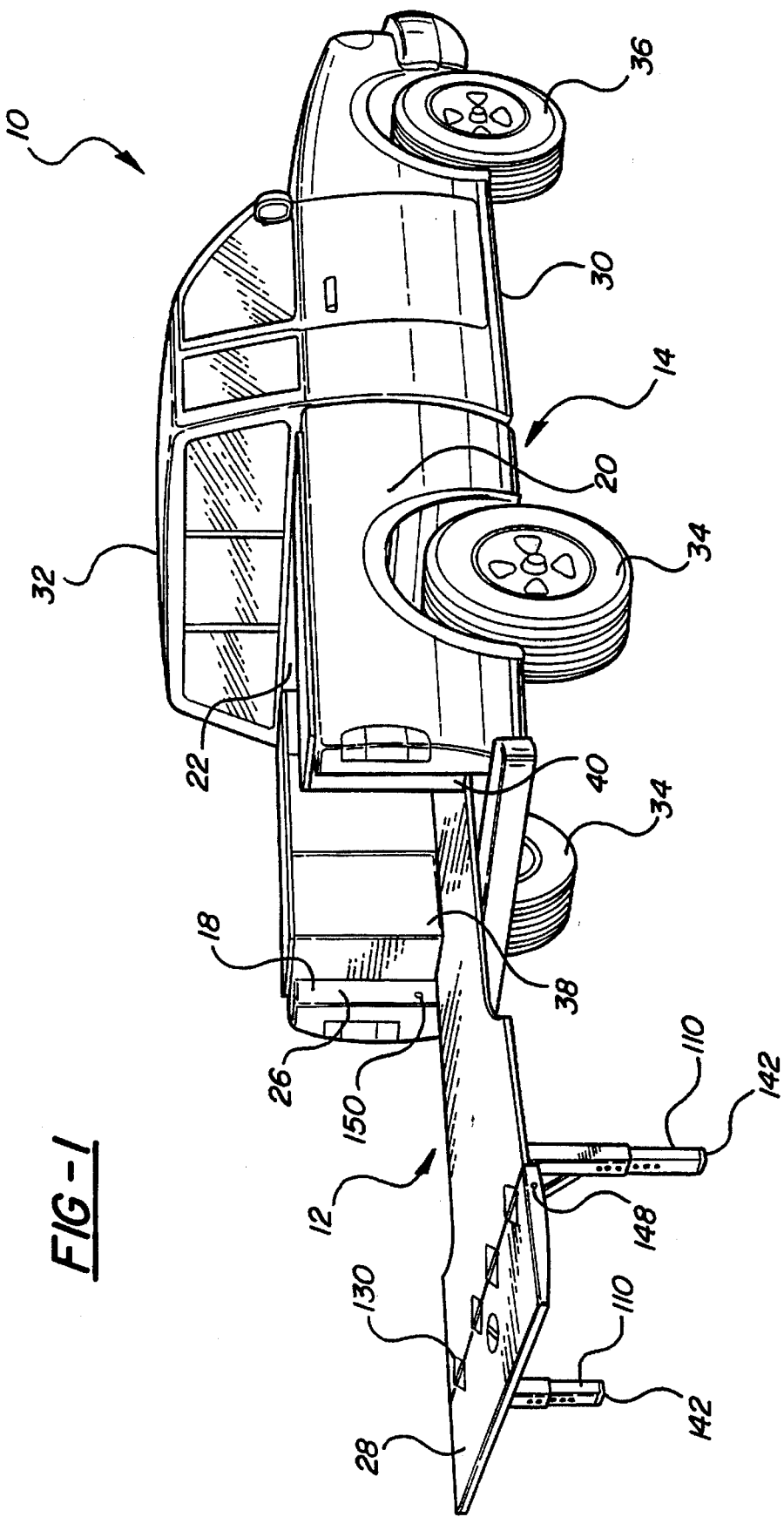
FIG. 1 is a perspective view of the workbench supported by rear legs and by a pickup truck.

The terms left, right, front and rear as used in the following description are as seen by the driver of the vehicle generally designated by the reference number 10 when sitting in the driver's seat.

The workbench generally designated by the reference number 12, is mounted in the truck box 14 of the vehicle 10 by a track system 16. The truck box 14 includes a left side wall 18, a right side wall 20, a front wall 22, a floor 24 and a rear opening 26. A tailgate or door 28 closes the opening 26. The truck box 14 is secured to a frame 30 of the vehicle 10 behind the cab 32. Driven rear wheels 34 and two steered front wheels 36 support and move the vehicle 10.

The side walls 18 and 20, the front wall 22, the floor 24 and the door 28 define a cargo compartment. As shown in the drawings, the cargo compartment has an open top. If desired the cargo compartment could be provided with a cover. Cargo compartments are also found in van type vehicles.

The truck box 14 as shown in FIGS. 1 and 9, has storage compartments 38 and 40 attached to the side walls 18 and 20. These storage compartments 38 and 40 are raised from the floor 24 to provide space for the workbench 12. Recesses are provided in the storage compartments 38 and 40 to accommodate the rear wheel wells 42 and 44 shown in FIG. 2. The wheel wells 42 and 44 do not show in FIG. 1 or 9 because they are covered by the storage compartments 38 and 40.

The track system 16 includes a first rail 46 mounted on the left side of the floor 24 and extending from the rear opening 26 to the front wall 22. The first rail 46 is a general vertical bar 48 and an integral horizontal bottom flange 50. Bolts with countersunk heads (not shown) clamp the bottom flange 50 to the floor 24 and the frame 30. A second rail 52, mounted on the right side of the floor 24 includes a vertical bar 54 and an integral horizontal bottom flange 56 clamped to the floor 24 and the frame 30 by bolts with countersunk heads (not shown). Both the first rail 46 and the second rail 52 are parallel to each other and extend substantially perpendicular to the rear opening 26.

Several left side rollers 58 with grooves 60 are supported by the first rail 46. Each left side roller 58 has a radially outer peripheral surface 62 that preferably rolls on the flange 50. The vertical bar 48 extends into the base of the groove 60 and limits the left side rollers 58 to movement along the long axis of the first rail 46. The sides 64 of the groove 60 in each left side roller 58 are conical and guide the bar 48 into the base of the groove.

Several right side rollers 66 with a groove 68 are supported by the second rail 52. Each right side roller 66 has a radially outer peripheral surface 70 that preferably rolls on the flange 56. The vertical bar 54 extends into the base of the groove 68 and limits the right side rollers to movement along the long axis of the second rail 52. The sides 72 of the groove 68 in each right side roller 66 are conical and guide the bar 54 into the base of the groove.

An H-beam 74 is secured to the floor 24 and the frame 30 by quick release mechanical fasteners 76. The I-bean 74 is between and parallel to the first rail 46 and the second 52. A central web 78 of the H-beam 74 has an integral horizontal bottom flange 80 and an integral horizonal top flange 82.

The left side rollers 58 and the right side rollers 66 are each journaled on a bearing for rotation about the axis of a bolt 84. A ninety degree angle member 86 is secured to each of the rollers 58 and 66 and the bolts 84 by a nut 88. A rigid plate member 90 is secured to the angle members 86 by bolts 92. The heads of the bolts 92 are in recesses 94 to leave the upper surface 96 of the plate member 90 clear of obstructions and to provide a workbench with a clear flat surface. The angle members 86 can be a separate member for each roller 58 and 66 as shown or there could be one angle member attached to all of the left side rollers and one angle member attached to all of right side rollers. If additional strength is required the bolts 84 can be attached to the plate member 90 on both sides of each roller 58 and 66.

Hold down rollers 98 are journaled on bearings secured to angle members 100 by bolts 102. The angle members 100 are attached to the bottom of the plate member 90 by bolts 104. The heads of the bolts 104 are recessed into the upper surface 96 of the plate member 90 like the heads of the bolts 92. Hold down rollers 98 to the left of the web 78 of the H-beam 74 as well as hold down rollers to the right of the web engage the downwardly facing surface of the horizontal top flange 82 of the H-beam and limit upward movement of the plate member 90 relative to the first and second rails 46 and 52. The function of the hold down rollers 98 and the H-beam 74 is to maintain engagement between the rollers 58 and 66 and the first and second rails 46 and 52 when the vehicle 10 moves over bumps. The hold down rollers 98 and the H-beam 74 also hold the plate member 90 in a generally horizontal position when the plate member 90 is moved to the rear on the first and second rails 46 and 52 and the center of gravity of the plate member and any cargo carried on the plate member is to the rear of the first and second rails.

Resilient bumpers 106 are secured to the forward edge of the plate member 90 by bolts 108. The bumpers 106 contact the front wall 22 of the truck box 14 to limit forward movement of the plate member. Bumpers 106 could also contact a fixed stop plate if the plate member 90 is to have limited forward movement and that movement is not limited by a front wall.

A pair of rear telescopic legs 110 have upper sections 112 attached to the bottom surface 114 of the plate member 90 by hinges 116. Lower portions 118 of the legs 110 are telescopically received in the upper section 112. Pins pass through apertures 120 and 122 to fix the length of the legs as required. A strut 124 is pivotally attached to each leg 110 and to a slider 126 as shown in FIG. 7. The slider 126 is guided in a track 128 and is locked to hold the leg 110 in a vertical position to support the plate member 90 or in a horizontal position for storage.

A tailgate or door 28 is connected to the rear portion of the plate member 90 by hinges 130. The hinges 130 are shown above the upper surface 96 of the plate member 90 for illustration only. Hinges 130 are preferably recessed into the door 28 and the plate member 90 so that the inside surface 132 of the door 28 is in a common plane with the upper surface 96 of the plate member 90 and nothing protrudes above the surface. A stop surface 134 on the door 28 contacts the bottom surface 114 of the plate member 90 to limit pivotal movement between the door and the plate member in one direction.

A handle 136, positioned in slots 138 and the plate member 90, can be used to move the plate member along the first and second rails 46 and 52. Pins 140 on the handle 136 can engage apertures through plates 142 on the free ends of the lower portions 118 of the rear legs 112 and lock the legs 110 in a storage position. The pins 130 are moved into or out of the apertures in the plates 142 by manipulating the lower portions 118 of the legs 110 or the handle 136. Handle 136 can also be removed from the slot 138 and the plate member 90.

A latch handle 144 is rotatably mounted in the center of the door 28. Rods 146 are connected to the latch handle 144 and the latch pins 148. As shown in FIG. 2 the latch pins 148 pass into recesses in the side walls 18 and 20, hold the door 28 in an open position and keep the plate members 90 from moving relative to the first and second rails 46 and 52. The handle 144 can be rotated manually to withdraw the latch pins 148 from the side walls 18 and 20 to free the plate member to move relative to the first and second rails 46 and 52 or free the door to move to a closed position. The latch pins 148 enter bores 150 in the walls 18 and 20 to hold the door 28 closed and hold the plate member 90 in the cargo compartment. An additional pair of pins 48 can be mounted higher in the door 28 to hold the upper portion of the door closed if required.

To employ the plate member 90 as a workbench, the pins 148 are retracted from the bores 150, the door 28 is pivoted from a vertical position to a horizontal position and the plate member 90 is rolled to the rear on the rollers 58 and 66 a short distance. The rear legs 110 are released, moved to vertical positions and locked in place. The length of the telescopic legs 110 can then be adjusted and the plate member 90 is rolled out of the cargo compartment until a spring loaded pin 152 on the front of the plate member 90 enters a groove 154 in the rear portion of the H-beam 74 and stops rearward movement of the plate member. The plate member 90 and the door 28 extension are then ready to be used as a workbench as shown in FIG. 1. The procedure is reversed to return the plate member 90 to the cargo compartment. Ramp 155 in the bottom of the slot 154 lifts the pin 152 to permit movement of the plate member into the cargo compartment.

Occasions may arise when it would be desirable to remove the workbench from the vehicle 10. This can be done when the plate member 90 is in the position shown in FIG. 1, by unlocking a pair of telescopic front legs 156 from a horizontal storage position under the plate member 90, pivoting them to a vertical position and then locking them in place. The front legs 156 are identical to the rear legs 110 except for their position on the plate member 90. The front legs 156 can be moved to vertical positions when the spring loaded pin 152 is in the groove 154, because the front legs 156 are positioned to the rear of the front edge of the plate member 90. After the length of each telescopic front leg 156 is adjusted, the pin 152 can be manually retracted and the plate member 90 can be moved to the rear of the first and second rails 46 and 52 to the position shown in FIG. 9. Wheels 158 on the rear legs 110 and wheels 160 on the front legs 156 make it easier to remove the workbench from the vehicle. As shown in FIG. 9, the wheels 160 are caster wheels and the wheels 158 rotate about an axis that is fixed relative to the rear legs 110.

When the plate member 90 is removed from the cargo compartment, the H-beam 74 can be removed and the floor 24 is cleared to transport cargo. The first and second rails 46 and 52 extend vertically up less than ½ inch and are at the edges of the cargo area and generally do not interfere with the transport of cargo.

Cargo can be carried directly on the plate member 90 if desired. Since the upper surface 96 of the plate member 90 is only slightly higher than the regular floor 24, cargo capacity reduction is minimal.

The floor 24 as discussed above may be the floor support beams of a standard pick-up truck box. With this arrangement the plate member 90 becomes with the only cargo supporting surface. With the fixed primary cargo floor 24 removed from the truck box 14, weight and cargo capacity of the vehicle 10 are substantially unchanged from that of a truck box 14 with a fixed floor 24 only.

While embodiments of the invention have been shown and described, other embodiments will now become apparent to those skilled in the art. Accordingly, the invention is not to be limited to that which is shown and described but by the following claims.

I claim:

1. A workbench in combination with a vehicle having a frame, an integral vehicle cargo compartment with a floor, a pair of sidewalls, an end wall, an access opening and an access opening door comprising: a first rail extending along the length of the cargo compartment, having a generally vertical bar and an integral bottom flange secured to the left side of the floor; a second rail extending along the length of the cargo compartment parallel to the first rail, having a generally vertical bar and an integral bottom flange secured to the right side of the floor; a rigid plate member forming a workbench positioned above the first and second rails; a plurality of left side rollers secured to the rigid plate member and supported and guided by the first rail for movement in directions parallel to the first rail; a plurality of right side rollers secured to the rigid plate member and supported and guided by the second rail for movement in directions parallel to the second rail; a center beam with a vertical web, a horizontal top flange and a horizontal bottom flange attached to the floor of the cargo compartment by mechanical fasteners and extending the length of the cargo compartment parallel to the first rail and the second rail; and a plurality of hold down rollers rotatably journaled on shafts attached to the bottom of the rigid plate member in positions in which they can engage a downward facing surface of the horizontal top flange and limit upward movement of the rigid plate member.

2. A workbench as set forth in claim 1 wherein the plurality of left side rollers each have a groove in their peripherity which receives the generally vertical bar of the first rail to restrict each left side roller to movement parallel to the first rail; and wherein the right side rollers each have a groove in their outer peripherity that receives the vertical bar of the second rail to restrict each right side roller to movement parallel to the second rail.

3. A workbench as set forth in claim 2 where the center beam is an H-beam and the hold down rollers are positioned so that some hold down rollers are to one side of the vertical web and other hold down rollers are to the other side of the vertical web.

4. A workbench as set forth in claim 1 wherein the access opening door is pivotally attached to the rigid plate member.

5. A workbench as set forth in claim 4 wherein the access opening includes a door latch that locks the door in a closed position and holds the rigid plate member in the cargo compartment.

6. A workbench as set forth in claim 1 including a pair of rear legs pivotally attached to the rigid plate member for pivotal movement between a storage position and a support position and having a telescopic portion for height adjustment.

7. A workbench as set forth in claim 6 including a pair of front legs pivotally attached to the rigid plate member for pivotal movement between a storage position and a support position for supporting a front portion of the rigid plate member when the rigid plate member is completely removed from the cargo compartment.

8. A workbench as set forth in claim 6 including at least one wheel rotatably journaled on a free end of each rear leg.

9. A workbench as set forth in claim 7 including at least one wheel rotatably journaled on a free end of each rear leg and at least one wheel rotatably journaled on a free end of each front leg.

10. A workbench as set forth in claim 1 including a spring biased pin mounted in a bore through the rigid plate that enters a slot in a slotted member connected to the floor to stop rearward movement of the rear rigid plate before the front end of the rigid plate becomes disengaged from the first and second rails.

11. A workbench in combination with a vehicle having a frame, an integral vehicle cargo compartment with a floor, a pair of side walls, and end wall, an access opening and an access opening door comprising:

a first rail extending along the length of the cargo compartment, having a generally vertical bar and an integral flange secured to the left side of the floor;

a second rail extending along the length of the cargo compartment parallel to the first rail, having a generally vertical bar and an integral bottom flange secured to the right side of the floor;

a rigid plate member forming a work bench positioned above the first and second rails;

a plurality of left side rollers secured to the rigid plate member each of which has an outer peripheral groove that receives the generally vertical bar of the first rail and is confined to movement in directions parallel to the first rail;

a plurality of right side rollers secured to the rigid plate member each of which has an outer peripheral groove that receives the generally vertical bar of the first rail and is confined to movement in direction parallel to the second rail; and whereby the rigid plate member and the attached rollers can be rolled out of and into the cargo compartment supported by the first and second rails and the left and right side rollers.

12. A work bench as set forth in claim 11 including a center beam with a vertical web, a horizontal top flange and a horizontal bottom flange attached to the floor of the cargo compartment by mechanical fasteners and extending the length of the cargo compartment parallel to the first rail and the second rail; and a plurality of hold down rollers rotatably journaled on shafts attached to the bottom of the rigid plate member in positions in which they can engage a downwardly facing surface on the horizontal top flange and limit upward movement of the rigid plate member.

13. A workbench as set forth in claim 12 where the center beam is an H-beam and the hold down rollers are positioned so that some hold down rollers are to one side of the vertical web and other hold down rollers are to the other side of the vertical web.

14. A workbench as set forth in claim 11 wherein the access opening door is pivotally attached to the rigid plate member.

15. A workbench as set forth in claim 14 wherein the access opening includes a door latch that locks the door in a closed position and holds the rigid plate member in a position in the cargo compartment.

16. A workbench as set forth in claim 11 including a pair of rear legs pivotable attached to the rigid plate member for pivotable movement between a storage position and a support position and having a telescopic portion for height adjustment.

17. A workbench as set forth in claim 16 including a pair of front legs pivotable attached to the rigid plate member for pivotable movement between a storage position and a support position for supporting a front portion of the rigid plate member when the rigid plate member is completely removed from the cargo compartment.

18. A method of preparing a rigid plate member supported in a cargo compartment of a vehicle by rollers with grooves and a pair of rails that extend into the grooves in the rollers and having a cargo compartment door pivotally attached to the rigid plate member, a door latch that latches the door in a closed position and a pair of telescopic legs attached to the rear portion of the rigid plate member for use as a workbench comprising:

(a) releasing the door latch;

(b) pivoting the door to a horizontal position in which the door forms an extension of the rigid plate member;

(c) rolling the rigid plate and the attached door partially out of the cargo compartment;

(d) adjusting the length of the telescopic legs as required;

(e) rolling the rigid plate and the attached door out of the cargo compartment until a rear portion of the plate member is supported by the telescopic legs and a front portion of the rigid plate member is supported by the pair of rails and the rollers in engagement with the pair of rails and the rigid plate member and the door are in positions to be used as a workbench.

* * * * *